July 21, 1936.   G. A. LYON   2,048,400
CLAM SHELL TIRE COVER
Filed June 10, 1931   2 Sheets-Sheet 1
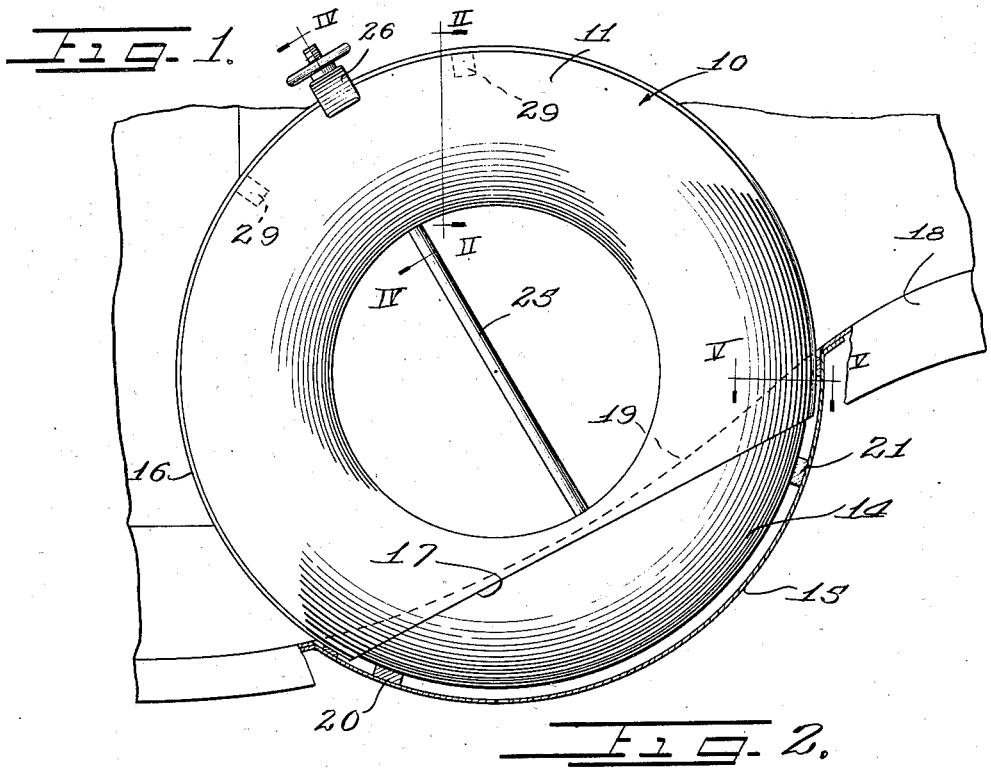
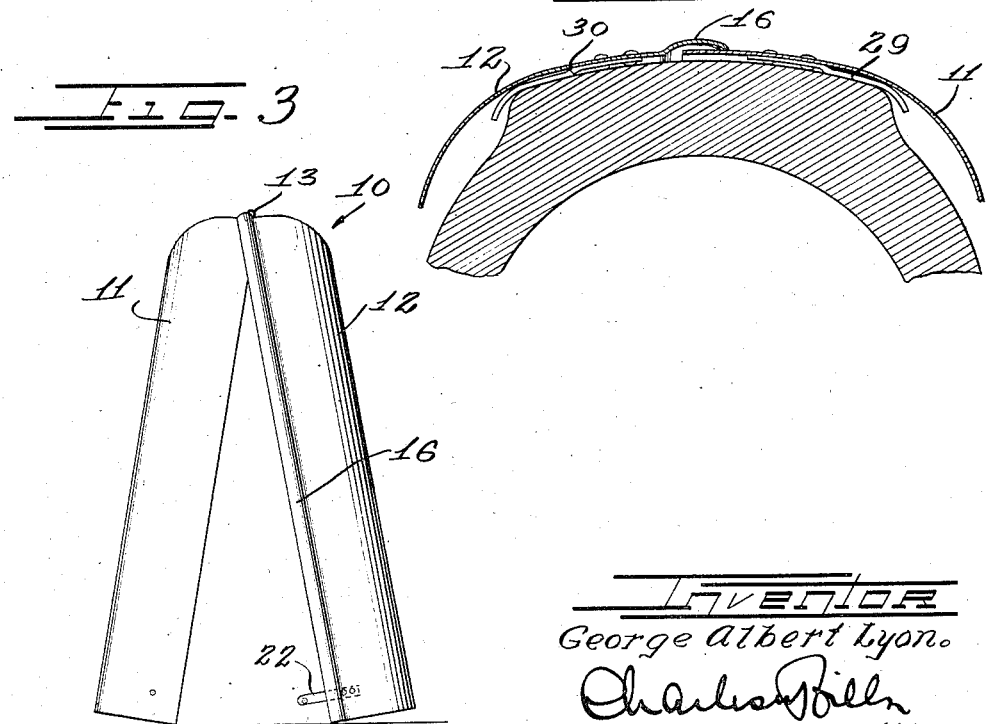
Inventor
George Albert Lyon.
by Charles Bill
Attys.

July 21, 1936.  G. A. LYON  2,048,400
CLAM SHELL TIRE COVER
Filed June 10, 1931  2 Sheets-Sheet 2
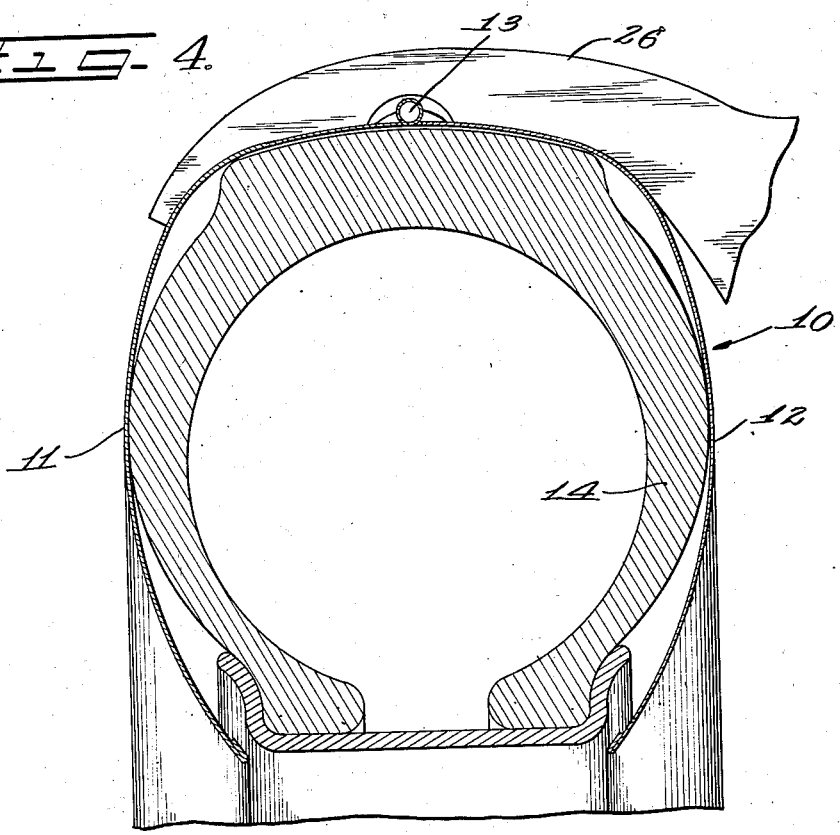
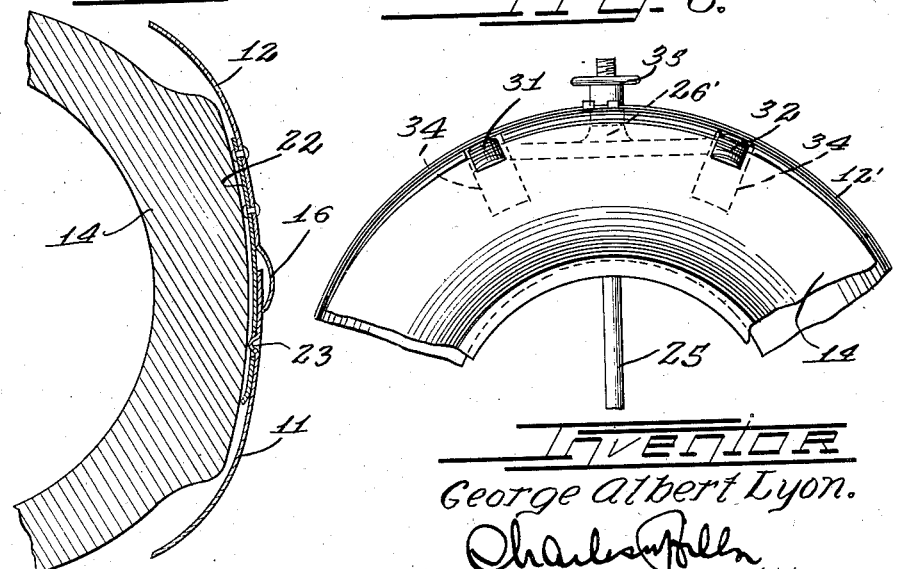
Inventor
George Albert Lyon.

Patented July 21, 1936

2,048,400

UNITED STATES PATENT OFFICE 2,048,400

CLAM SHELL TIRE COVER

George Albert Lyon, Allenhurst, N. J., assignor to Lyon Incorporated, Asbury Park, N. J., a corporation of Delaware Application June 10, 1931, Serial No. 543,337

8 Claims. (Cl. 150—54)

This invention relates to spare tire covers and more particularly to a tire cover embodying two halves or sections hingedly connected in such a manner as to resemble a clam shell.

An object of this invention is to provide an improved tire cover shaped to resemble a clam shell and adapted to be positioned with a minimum amount of effort on the tire in proper tire protecting position.

Another object of the invention is to provide a tire cover embodying two sections connected together in such a manner as to permit of the sections being successively disposed on the tire with one section on one side of the tire and the other on the other side of the tire whereby once these sections are properly disposed on the tire they will substantially enclose the tire and can be held in cooperation with each other.

In accordance with the general features of this invention there is provided a clam shell tire cover embodying two sections hingedly connected together in such a fashion as to permit of these sections being successively mounted on the tire and being provided with yieldable means whereby these sections may be yieldably secured together in proper tire protecting position.

Other objects and features of this invention will more fully appear from the following detailed description taken in connection with the accompanying drawings which illustrate several embodiments thereof and in which Figure 1 is a fragmentary view partly in section of a fenderwell supported spare tire with a clam shell cover thereon embodying the features of this invention;

Figure 2 is an enlarged fragmentary sectional view taken on substantially the line II—II of Figure 1 looking in the direction indicated by the arrows;

Figure 3 is an end view of my novel clam shell cover showing the two sections thereof separated from each other and ready for disposition over a tire to be enclosed thereby;

Figure 4 is an enlarged fragmentary cross sectional view taken on the line IV—IV of Figure 4 looking in the direction indicated by the arrows;

Figure 5 is an enlarged fragmentary sectional view taken on the line V—V of Figure 1 looking downwardly; and Figure 6 is a fragmentary view of a modification of my clam shell showing one section of the cover removed from the tire and illustrating the manner in which the tire may be forced downwardly in the shell by suitable spare tire supporting means.

The reference character 10 designates generally a clam shell spare tire cover embodying two sections 11 and 12 (Figure 3) suitably hinged together as indicated at 13. This cover may be made of any suitable material as for example metallic sheet and may be fabricated by spinning or punch press operations or in any other suitable or desirable manner.

Each section comprises half of the cover and is adapted to enclose substantially half of the spare tire to be disposed therein such for example as the spare tire 14 shown in Figure 1 as being mounted in a conventional fenderwell 15. Also one of the sections may be formed with an enlarged peripheral or marginal portion 16 adapted to receive or have inserted therein the peripheral edge of the other section as is evident from Figure 3. In other words, the two sections 11 and 12 are adapted when in a proper tire protecting position on the tire to assume a telescoping relation.

By referring to Figures 1 and 3 it is to be noted that each of the sections 11 and 12 while annular in shape does not comprise a complete annulus since the lower end of each section is cut off on a straight line as indicated at 17 in Figure 1. Each section however should be of such a circumferential length as to extend around at least slightly more than one-half of the outer periphery of the tire so that when the cover is in proper tire protecting position on the tire it cannot be displaced from the tire by a mere upward movement of the cover. Further it is to be noted that the lower substantially straight edge 17 of each section is designed to be disposed below the top surface of the fender 18 defining the fenderwell 15. The top surface of the fender 18 adjacent the fenderwell 15 is indicated by the dotted line 19 in Figure 1.

The spare tire 14 may in the present fenderwell installation be mounted upon a pair of spaced pads 20 and 21 disposed in the fenderwell which pads may be made of any suitable material such for example as felt or rubber.

After the clam shell cover of my invention has been shoved downwardly on the tire and the sections brought into telescoping cooperation the sections 11 and 12 may be suitably and yieldably secured together by means of a spring 22 secured to the lower end of the section 12 and adapted to extend into the section 11 to engage over a projection 23 formed on the inner surface of the section 11 as best shown in Figure 5.

Once the cover is on the tire the tire and cover may be bodily dropped into the fenderwell 15 and then turned until the same assume the position shown in Figure 1. Thereafter the tire and cover may be held in the fenderwell 15 by the usual clamping rod 25 carried by the chassis of the automobile and provided at its upper end with suitable clamping means 26 for engaging over the outermost periphery of the cover 10 as best shown in Figure 4.

Moreover it is to be noted from Figure 2 that each of the sections 11 and 12 may be provided on its internal side with a suitable spring-like clip by which clips are designated in Figure 2 by the reference characters 29 and 30. These clips may be suitably bolted or riveted to the sections 11 and 12. The purpose of these clips as will be evident from Figure 2 is to centrally align the tire with the cover 10. Several pairs of these clips may be disposed at spaced intervals in the cover so that the alignment of the tire with the cover is easily accomplished.

In Figure 6 I have illustrated a modification of my cover in which a modified form of clamping arm 26' is provided on the rod 25 for cooperation with the tire and cover to maintain the tire and cover in proper position in the fenderwell 15. It will be noted that this clamping arm 26' comprises two spaced legs 31 and 32 insertable through slots 33 and 34 in one of the sections 12' of the cover. The arms or legs 31—32 are shaped to conform with the transverse curvature of the tread so that these two arms will engage properly over the tread of the tire. Needless to say, by drawing the clamping arm 26' downwardly on the rod 25 by means of a nut 35 threaded on the upper end of the rod 25 it is possible to force the tire and the cover thereon downwardly into tight cooperation with the fenderwell 15.

Now I desire it understood that although I have illustrated and described in detail the preferred embodiment of my invention, the invention is not to be thus limited but only insofar as defined by the scope and spirit of the appended claims.

I claim as my invention:

1. In a spare tire cover for use with a tire mounted in a fender well, a pair of cooperable sections hingedly connected together so as to form a clam shell construction adapted to be shoved endwise onto the tire, means for connecting the sections together to hold them in place on the tire when the cover is thereon, said sections extending around substantially more than 180° of the outer circumference of the tire and each section having a circular form less than a complete circle so that the tire cover will only extend part way into a fenderwell in which the cover and spare tire is mounted, and means for forcing the cover downwardly on the tire in the fender well.

2. In a spare tire cover for use with a tire mounted in a fender well, a pair of cooperable sections hingedly connected together so as to form a clam shell construction adapted to be shoved endwise onto the tire, means for connecting the sections together to hold them in place on the tire when the cover is thereon, said latter means comprising yieldable elements connected to one section for cooperation with the other, said sections extending around substantially more than 180° of the outer circumference of the tire and each section having a circular form less than a complete circle so that the tire cover will only extend part way into a fenderwell in which the cover and spare tire is mounted, and means for forcing the cover downwardly on the tire in the fender well.

3. In a spare tire cover for use with a tire mounted in a fender well, a pair of cooperable sections hingedly connected together so as to form a clam shell construction adapted to be shoved endwise onto the tire, means for connecting the sections together to hold them in place on the tire when the cover is thereon, said sections being formed so as to telescopingly engage each other when they are in proper tire protecting position on the tire, said sections extending around substantially more than 180° of the outer circumference of the tire and each section having a circular form less than a complete circle so that the tire cover will only extend part way into a fenderwell in which the cover and spare tire is mounted, and means for forcing the cover downwardly on the tire in the fender well.

4. In a spare tire cover for use with a tire mounted in a fender well, a pair of cooperable sections hingedly connected together so as to form a clam shell construction adapted to be shoved endwise onto the tire, means inside of said sections for aligning the tire therein to facilitate mounting of the cover thereon and to enable proper positioning of the tire within the cover, said sections extending around substantially more than 180° of the outer circumference of the tire and each section having a circular form less than a complete circle so that the tire cover will only extend part way into a fenderwell in which the cover and spare tire is mounted, and means for forcing the cover downwardly on the tire in the fender well.

5. In a tire cover, a pair of cooperable sections hingedly connected together so as to form a clam shell construction adapted to be shoved endwise onto the tire, and means for connecting the sections together to hold them in place on the tire when the cover is thereon, said sections extending around substantially more than 180° of the outer circumference of the tire and each section having a circular form less than a complete circle so that the tire cover will only extend part way into a fenderwell in which the cover and spare tire is mounted, the rear section of said pair of sections being apertured at the top of the cover to accommodate clamping means between the cover and the tire when the cover is mounted on a vehicle.

6. In a tire cover, a pair of cooperable sections hingedly connected together so as to form a clam shell construction adapted to be shoved endwise onto the tire, and means for connecting the sections together to hold them in place on the tire when the cover is thereon, said sections being formed so as to telescopingly engage each other when they are in proper tire protecting position on the tire, the rear section of said pair of sections having spaced apertures for accommodating tire clamping means at the top of the tire when the cover is in position on a spare tire mounted on an automobile vehicle.

7. As an article of manufacture, a clam shell tire cover for downward application to a spare tire in a fenderwell, embodying a pair of sections hingedly connected together and having open ends opposite the hinge, and provided at said ends with means for yieldably connecting the sections together to hold them in closed cooperation when they are on the tire, said ends being located at the lower end of the cover to provide for the downward movement of the cover into the well and bring the upper end of the cover into holding engagement with the tire.

8. As an article of manufacture, a clam shell tire cover for downward application to a spare tire carried in a vehicle fenderwell, embodying a pair of sections inseparably hinged together to provide a unitary structure and having open ends opposite the hinge, and provided at said ends with means for yieldably connecting the sections together to hold them in closed cooperation when they are on the tire, said ends being located at the lower end of the cover to provide for the downward movement of the cover into the well and bring the upper end of the cover into holding engagement with the tire.

GEORGE ALBERT LYON.